F. O. Degener,
Automatic Fan,
Nº 25,892. Patented Oct. 25, 1859.
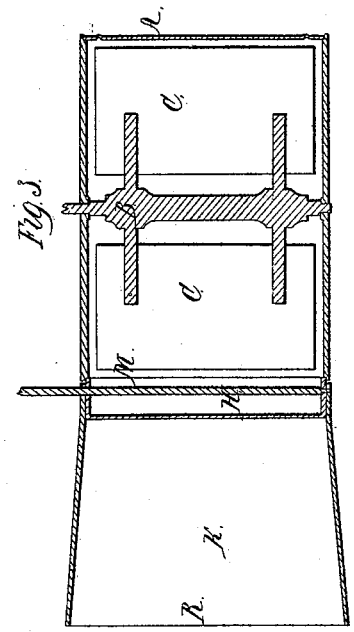
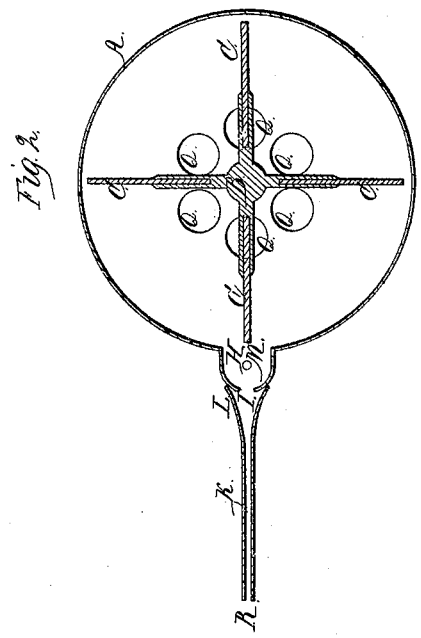
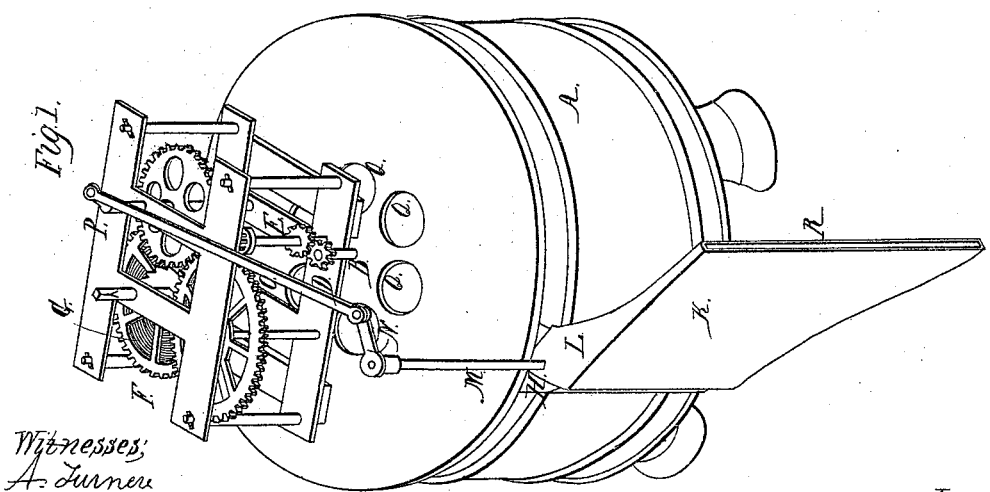

UNITED STATES PATENT OFFICE.

FREDERICK O. DEGENER, OF NEW YORK, N. Y.

AUTOMATIC FAN.

Specification of Letters Patent No. 25,892, dated October 25, 1859.

*To all whom it may concern:*

Be it known that I, FREDERICK O. DEGENER, of New York, in the county and State of New York, have invented a certain new and useful Improved Automaton Fan; and I do hereby declare that the following is a full, clear, and exact description of the same, reference being had to the accompanying drawings and the letters of reference thereon, all of which form a part of this specification, the same letters of reference always designating the same object or part of the machine in all the figures.

The nature of my invention consists in the peculiar construction and combination of an "automaton fan" which is arranged in such a manner that part of the machine will set the air in motion, and thus cause a current of air which will be sent or thrown in different directions by another movable part or parts of the machine or fan.

To enable others skilled in the art to make and use my invention I shall further explain and describe its construction and operation.

Of the drawings, Figure 1, is a perspective view of the automaton fan. Fig. 2, is a horizontal section at or near the center of its height. Fig. 3, is a vertical section in a line running centrally through the longest part of the machine or automaton fan, without the wheelwork shown in Fig. 1.

The same letters refer to like parts in all the figures of the drawings, the details of which I shall now proceed to explain.

I provide a box or casing of proper size, as shown at (A, Figs. 1, 2, and 3,) into which I place a spindle (B, Figs. 1, 2, and 3,) having radiating fans (C, Figs. 2, and 3); said spindle is to be supported in proper bearings, so that it can revolve freely, one end of the spindle (B) I provide with a pinion or small spur wheel (D, Fig. 1,) which is geared into another wheel (E) that is connected with and forms part of a wheelwork shown in Fig. 1, at (F,) which is moved by a spring (G,) or may be operated by any other motive power. The side of the casing (A) is provided with a semicircular (or nearly so) projection (H Figs. 1, 2, and 3,) which has an opening (I, Fig. 2) so as to allow the air to escape when the rotating fans are in motion; to this semicircular projection (H) I attach a hollow fan (K, Figs. 1, 2, and 3) or an equivalent device, in such a manner that it can vibrate or change positions when the machine is in motion. That part of the vibrating fan (K) which is next to the projection (H) I make funnel shaped, as shown at (L, Figs. 1, and 2,) so that the current of air caused by the revolving fans or blower will enter the distributing or vibrating fan (K) easily while it is in motion. This vibrating fan (K) is attached to a shaft (M Figs. 1, 2, and 3,) at the point of vibration; a crank (N, Fig. 1,) is fastened to this shaft (M) at its upper end and is connected by means of a connecting rod or bar (O, Fig. 1) to another crank (P, Fig. 1,) which is attached to the shaft of one of the wheels of the driving mechanism (F); this crank (P) is made somewhat shorter than the crank (N) which is to move the fan (K) so that as the crank (P) revolves it will cause the crank (N) with the fan (K) to vibrate. The top and bottom (both or either of them) of the casing (A) I provide with openings (Q, Figs. 1 and 2,) near the center where the spindle of the revolving fans is located, so that the air can enter freely while the revolving fan is in motion.

A pair of bellows might be used instead of a rotating fan blower to cause a current of air, but I prefer this rotary fan blower on account of its simplicity.

One or more vibrating hollow fans may be placed around the casing of the revolving fans, if desired, so that several persons may be benefited by only one machine or automaton fan.

The machine may be constructed of different kinds of suitable materials according to taste and judgment; it may be provided with short feet so that it can be placed on a table or desk, or it may be mounted upon a separate stand and be made adjustable so that it can be raised or lowered to whatever position may be found most beneficial.

*Operation.*—Having the different parts constructed and combined as described, then, when the spring (G) is wound up it will set the wheelwork in motion which will cause the blowing fans to revolve very rapidly and draw the air in through the openings (Q) and through or by the centrifugal action of the revolving fans force the air through the opening (I, Fig. 2) into the hollow fan (K), through which the air will pass and escape at its mouth (R, Figs. 1, 2, and 3), this fan (K) being connected with the wheelwork by cranks and a connecting rod, will vibrate in harmony with the revolving fans, and spread or distribute the air as it escapes at the opening (R).

*Remark.*—Revolving fans or a fan inclosed in a casing provided with proper openings, causes a current of air when the fan is revolving rapidly, this is a well known fact; but it would be very unpleasant to have a steady stream of air blown at you; now by combining a vibrating or distributing fan or its equivalent with a rotary fan or blower, the current of air caused by the rotary fan will be thrown in different directions by passing through the vibrating fan, while at the same time the vibrating fan acts with its sides against the air, thus a larger quantity of air is set in motion by this combination and yet the same sensation produced as if the motion of the air was caused by the vibrating fan alone. While the revolving fan causes a current of air it acts at the same time as a governor to the driving mechanism. Although the revolving fanblower and the revolving crank that moves the vibrating fan, are shown to be driven by gearing directly connected with the wheelwork, yet they may be connected with the moving power and driven by means of pulleys and band or bands, in which case there will be little or no noise, which, perhaps by many persons would be preferred.

Having thus fully described my "automaton fan," what I claim therein as new and as my invention and desire to have secured to me by Letters Patent is:—

I claim the arrangement and combination of a rotary fan-blower with the hollow vibrating or distributing fan, for the purpose of producing a current of air and causing it to be distributed substantially as and for the purpose specified.

F. O. DEGENER.

Witnesses:
A. TURNER,
A. T. FANSHAW.